United States Patent [19]

Jones

[11] Patent Number: 5,882,146
[45] Date of Patent: Mar. 16, 1999

[54] IMMOBILIZATION OF MATERIALS

[75] Inventor: Thomas Richard Jones, Cornwall, United Kingdom

[73] Assignee: ECC International Limited, United Kingdom

[21] Appl. No.: 924,471

[22] Filed: Aug. 21, 1997

Related U.S. Application Data

[63] Continuation of Ser. No. 550,064, Oct. 30, 1995, abandoned, which is a continuation of Ser. No. 128,595, Sep. 28, 1993, abandoned.

[30] Foreign Application Priority Data

Sep. 29, 1992 [GB] United Kingdom .................. 9220561

[51] Int. Cl.$^6$ ...................................................... B09B 3/00
[52] U.S. Cl. ................... 405/128; 106/288 B; 405/128; 502/84; 588/252
[58] Field of Search ................................. 588/249, 252, 588/254, 258; 405/128, 129, 263, 264; 208/13; 502/84; 106/288 B

[56] References Cited

U.S. PATENT DOCUMENTS

| Re. 25,464 | 10/1963 | Duke et al. . | |
|---|---|---|---|
| 4,028,265 | 6/1977 | Barney et al. . | |
| 4,112,033 | 9/1978 | Lingl | 588/252 X |
| 4,144,162 | 3/1979 | Edgar et al. . | |
| 4,149,968 | 4/1979 | Kupiec et al. | 588/252 X |
| 4,186,027 | 1/1980 | Bell et al. | 106/288 B |
| 4,342,732 | 8/1982 | Smith | 588/252 X |
| 4,436,645 | 3/1984 | Ceasar . | |
| 4,882,092 | 11/1989 | Sappok . | |
| 4,937,210 | 6/1990 | Jones et al. | 501/80 |
| 5,055,429 | 10/1991 | Jones et al. | 501/80 |
| 5,269,975 | 12/1993 | Noakes | 588/252 X |
| 5,277,519 | 1/1994 | Nahm | 405/128 |
| 5,326,734 | 7/1994 | Vaughan | 502/84 |
| 5,347,069 | 9/1994 | Sundar | 405/128 X |
| 5,416,051 | 5/1995 | Vaughan | 502/84 |
| 5,418,195 | 5/1995 | Kostuch et al. | 501/80 |

FOREIGN PATENT DOCUMENTS

| 0 128 966 | 12/1984 | European Pat. Off. . |
| 0 283 572 | 9/1988 | European Pat. Off. . |
| 0 400 961 | 5/1990 | European Pat. Off. . |
| 0 491 520 | 6/1992 | European Pat. Off. . |
| 2302970 | 1/1976 | France . |
| 0491688 | 3/1976 | U.S.S.R. . |
| 0814926 | 2/1979 | U.S.S.R. . |
| 2254322 | 10/1992 | United Kingdom . |
| WO 82/00998 | 4/1982 | WIPO . |

OTHER PUBLICATIONS

Database WPI Section Ch. Week 7647, Derwent Publication Ltd., London, GB; Class D23, AN 76–88235X & SU–A–491 699 (Mosc Br Fats Res.) 16 Mar. 1976.

Zoshchuck N.I. et al., Belgorod Cons Mat, Abstract Accession No. 81–96496D/52.

*Primary Examiner*—Dennis L. Taylor
*Attorney, Agent, or Firm*—Klauber & Jackson

[57] ABSTRACT

There is disclosed a method for immobilizing an oily or non-polar substance in a concrete matrix comprising the following steps:

(a) absorbing the said oily or non-polar substance into a calcined clay mineral;

(b) incorporating the calcined clay mineral and absorbed oily or non-polar substance formed in step (i) in a hardenable concrete mix; and (c) permitting the resultant concrete mix to harden.

10 Claims, No Drawings

IMMOBILIZATION OF MATERIALS

This application is a continuation of application Ser. No. 08/550,064, filed Oct. 30, 1995, now abandoned, which is a continuation of Ser. No. 08/128,595 which is now abandoned, filed Sep. 28, 1993.

This invention relates to a method for disposing of an oily or non-polar material in such a way that it is permanently fixed in a concrete matrix and is resistant to being leached out into the environment. More particularly, but not exclusively, the invention is concerned with such a disposal method in which the oily or non-polar material is a component of a waste material.

It is well known that toxic waste materials can be immobilised in a concrete matrix (see for example, GB-A-2254322, EP-A-0128966, WO-A-82/00998 and U.S. Pat. No. 4,882,092). Generally the toxic waste, in the form of a particulate solid or of an aqueous suspension or solution, is mixed with cement, a fine aggregate material such as sand and water, and optionally a coarser aggregate material, and the wet mixture is poured into containers, such as steel drums, or into a cavity in a landfill site or is formed into concrete blocks and is allowed to cure to form a hard concrete matrix.

In the case of many toxic waste materials this known method is satisfactory, and the waste material is firmly fixed in the concrete matrix and is not leached out to any significant extent into the environment. However, if the toxic waste contains a proportion of oily or non-polar liquid material, either as a separate phase or in emulsion form, problems are experienced with this method. Oily materials are not easily incorporated into concrete, and, even if this is successfully achieved, the oily component tends to leach out relatively rapidly.

It has been proposed that the retention of the oily waste material in the concrete can be improved by first absorbing the waste material on to a particulate solid material having a hydrophobic surface such as an organophilic clay. The particulate solid material with the waste material absorbed to its surface is then mixed with cement, a fine aggregate material and water to form a concrete matrix. However, this method is expensive because of the high cost of the hydrophobic particulate solid material, and unsatisfactory because it is found that the toxic waste material can still leach from the concrete matrix relatively rapidly.

U.S. Pat. No. 4,028,265 discloses a process for immobilising aqueous radioactive waste; the waste must contain a caustic material and sodium nitrate which undergo a reaction with an aluminium silicate clay to form the mineral cancrinite which entraps the radioactive isotopes. The cancrinite may be converted to the mineral nephaline by firing. The cancrinite (or nephaline) product may be formed into a mechanically stronger product by adding a binder, such as portland cement.

EP-A-0283572 describes aprocess which makes use of a mixture of cement and an activated swellable bentonite to immobilise radioactive water.

According to a first aspect of the present invention, there is provided a method for immobilising an oily or non-polar substance in a concrete matrix comprising the following steps:

(a) absorbing the said oily or non-polar substance into a calcined clay mineral;

(b) incorporating the calcined clay mineral and absorbed oily or non-polar substance formed in step (i) in a hardenable concrete mix; and (c) permitting the resultant concrete mix to harden.

The present invention is particularly suited to a method in which the oily or non-polar substance is a liquid, particularly a liquid component of a waste material.

The amount of calcined clay mineral employed should be at least sufficient to absorb the oily or non-polar liquid substance. Typically, this will require that at least 0.5 kilogram of calcined clay mineral is employed per kilogram of oily or non-polar liquid substance. It is unlikely that the amount of calcined clay required will exceed 5.0 kilogram per kilogram of oily or non-polar liquid substance.

The hardenable concrete mix employed in step (b) of the method of the present invention may, for example be prepared using cement and water and, optionally, a fine aggregate material. These components are used in proportions such that hardenable concrete mix is formed. Thus, the components are preferably mixed in the proportions: mixture formed in step (a) 5–30% by weight; cement 20–95% by weight and fine aggregate up to 80% by weight. By "fine aggregate" we mean a particulate solid material comprising particles having a minimum size of about 0.15 mm and a maximum size of about 5 mm. An example of a suitable fine aggregate is silica sand. Sufficient water is added to yield a plastic composition. Generally the weight ratio of water to cement is in the range from 0.25 to 0.75. If desired a small proportion of a plasticising chemical may be added to reduce the weight ratio of water to cement to near the lower limit of the range stated hereinabove. The cement used may be ordinary Portland cement, high alumina cement or mixture of these with each other or with pulverised fly ash, ground granulated blast furnace slag, silica fume or natural pozzolanic materials such as trass or zeolites. An aggregate material having an average particle size generally coarser than that of the fine aggregate may also be incorporated into the concrete mix if desired.

The concrete mix formed in step (b) may be poured into a mould, such as a suitable cavity or container before being allowed to harden.

The method of the present invention is particularly suited to the disposal of toxic oily or non-polar waste materials which, by way of the invention, can be permanently immobilised in the concrete matrix. The toxic waste material may comprise, for example, polychlorinated biphenyls, dioxines or radioactive species.

In step (a) the calcined clay mineral is preferably formed by heating a kandite clay mineral, for example kaolinite, dickite, nacrite or halloysite to a temperature in the range from 450° C. to 950° C. for a time such that the loss on ignition for two hours at 1000° C. of a sample of the calcined mineral is less than 1% by weight. This forms a calcined clay which is capable of absorbing oily or non-polar substances and is also capable of undergoing pozzolanic reaction with calcium hydroxide. Most preferably the calcined clay mineral is metakaolin. This may be formed by calcining a kaolinitic clay mineral at about 750° C. for about 4 hours. Metakaolin prepared in this way generally absorbs from 50% to 100% by weight of its own weight of oil. Advantageously, the amount of the calcined clay mineral used is from 1.0 to 2.0 kg. per kilogram of oily or non-polar liquid substance in the waste material.

The particles of the calcined clay are preferably no greater than 50 $\mu$m (in order to ensure that the reaction does not become undesirably slow) and preferably no smaller than 0.1 $\mu$m (in order to maximise the absorptive power of the calcined clay.

It is believed that calcined clay minerals, and especially metakaolin, take part in a pozzolanic reaction with calcium hydroxide which is formed during the hydration of the cement in the concrete mix. As a result, the calcined clay mineral recrystallises to give new cementitious phases which are incorporated into the bulk structure of the concrete and substantially fill the pores which normally make concrete permeable. The reaction between metakaolin and calcium hydroxide is believed to be:

$$Al_2O_3 \cdot 2SiO_2 + 3Ca(OH)_2 + 6H_2O \rightarrow$$

$$2CaO \cdot Al_2O_3 \cdot SiO_2 \cdot 8H_2O + CaO \cdot SiO_2 \cdot H_2O$$

The mineral $2CaO.Al_2O_3.SiO_2.8H_2O$ is known as gehlenite. Almost certainly, other hydrated calcium silicates and/or hydrated calcium aluminium silicates are formed as well.

It is evident that the waste material to be immobilised should not contain substantial amounts (for example more than about 30% by weight) of materials which would react rapidly with the calcined clay to convert it into a material which is unable to participate in a pozzolanic reaction with calcium hydroxide which is formed during the hydration of the cement in the concrete mix.

Even when the calcined clay mineral has absorbed on to it a substantial quantity of oily or non-polar liquid waste material it still reacts with calcium hydroxide in this way, with the result that a substantially liquid impervious concrete matrix is formed in which the waste material is permanently fixed, and from which it can not easily be leached out.

Thus, in accordance with a second aspect of the present invention, there is provided a substantially liquid impervious hardened concrete matrix having an oily or non-polar substance substantially permanently isolated within pores in the matrix, said pores within the matrix being sealed off from each other by the mineral(s) which crystallize(s) in situ in the pozzolonic reaction between a calcined clay mineral and calcium hydroxide formed during hydration of the cement in the concrete mix.

In accordance with a third aspect of the present invention, there is provided a hardenable concrete mix incorporating a calcined clay onto which is absorbed an oily or non-polar liquid substance.

In accordance with a fourth aspect of the present invention, there is provided a hardened concrete matrix prepared by the method of the first aspect of this invention.

The invention will now be illustrated by reference to the following Examples. In these Examples, linseed oil and single cream were used to mimic the oily or non-polar liquid waste substances which it is commonly desired to dispose of safely.

EXAMPLE 1

The quantity of an oil absorbed by a given weight of a sample of a metakaolin was measured by the following method. Approximately 5 g of dry metakaolin was weighed and placed on a glass slab. Acid-refined linseed oil was added dropwise from a burette and constantly rubbed into the metakaolin with a palette knife. Additions of linseed oil were continued until conglomerates of oil and metakaolin were formed. Thereafter the oil was added more slowly, and thoroughly rubbed into the metakaolin after each drop. The test was regarded as complete when a smooth homogeneous paste was formed.

With the acid-refined linseed oil, a minimum of 0.59 kg of oil was needed to form a paste with 1.0 kg of metakaolin.

EXAMPLE 2

The test described in Example 1 was repeated using single cream to represent an oil-in-water emulsion in place of the acid-refined linseed oil. A minimum of 0.93 kg of the cream was required to form a paste with 1.0 kg of metakaolin.

EXAMPLE 3

The test described in Example 1 was repeated using pure water in place of the acid-refined linseed oil. A minimum of 0.66 kg of water was required to form a paste with 1.0 kg of metakaolin.

EXAMPLE 4

A batch of mortar was prepared according to the following composition:

| Parts by weight | |
|---|---|
| Ordinary Portland cement | 1 |
| Fine aggregate (0.15 mm–5.0 mm) | 3 |
| Superplasticiser | 0.02 |
| Water | 0.35 |
| Acid-refined linseed oil | 0.06 |

The ingredients were thoroughly mixed and were then poured into a mould having the shape of a cube of side length 150 mm. After 28 days the mortar block was removed from the mould and immersed in water. Appreciable quantities of oil were observed to rise to the surface of the water after only 2 days.

EXAMPLE 5

The experiment of Example 4 was repeated except that 15% by weight of the Portland cement was replaced by metakaolin (on a pure basis). The metakaolin had been pre-mixed with an acid-refined linseed oil by blending together 400 g of the linseed oil with 1000 g of the metakaolin in a mixer until a fine, apparently dry, free flowing powder was formed.

A mortar was made up according to the following composition:

| Parts by weight | |
|---|---|
| Ordinary Portland cement | 0.85 |
| Metakaolin/oil mixture | |
| Metakaolin | 0.15 |
| Acid-refined linseed oil | 0.06 |
| Fine aggregate (0.15 mm–5.0 mm) | 3.00 |
| Superplasticiser | 0.02 |
| Water | 0.35 |

The ingredients were thoroughly mixed and poured into a mould having the shape of a cube of side length 150 mm. After 28 days the mortar block was removed from the mould and immersed in water. No oil was observed to rise to the surface of the water over a period of 3 months.

EXAMPLE 6

A first mortar was made up according to the composition given in Example 4 above and a second mortar was made up according to the composition given in Example 5 above. In the case of the second mortar, the metakaolin/oil mixture was prepared by blending together 400 g of the linseed oil and 1000 g of the methaqualone in a mixer until a fine, apparently dry, free flowing powder was formed.

A third control mortar was prepared according to the composition given in Example 4, except that no acid-refined linseed oil was included.

In each case the ingredients were thoroughly mixed and poured into moulds having the shape of a cube of side length 150 mm. After 28 days the mortar blocks were removed form the mould. Two blocks for each mortar formulation were tested for compressive strength by the measurement procedure laid down in British Standard Specification No. 2028, 1364: 1968 "Precast concrete blocks". Other blocks for each mortar formulation were crushed with a jaw crusher and screened on a sieve of aperture size 1.4 mm. The portion of the mortar in each case which was retained on the sieve was subjected to an oil leaching test after any pieces of coarse aggregate present in the sample had been picked out by hand. A 20 g sample of each batch of crushed mortar was extracted with 400 g of dilute sulphuric acid at pH 3.5 for 24 hours at room temperature. The amount of organic material leached into the liquid phase was determined by total organic carbon analysis of the filtrate formed when the liquid phase was separated from the solid residue by filtration. The results obtained are set forth in Table 1 below:

TABLE 1

| Mortar | 28 day compressive strength (N.mm$^{-2}$) | Amount of leached oil ($\mu$g carbon per g. mortar) |
| --- | --- | --- |
| As Example 4 (comparative) | 35 | 1280 |
| As Example 5 (inventive) | 34 | 650 |
| Control (comparative) | 67 | 23 |

It can be seen from the above results that, even in this severe oil leaching test, in which the mortar is crushed before leaching with dilute acid, the presence of methaqualone greatly reduces the amount of oil which is leached from the concrete.

It is also observed that, although the compressive strength of the concrete is decreased when linseed oil is present, no significant further decrease is detected when part of the cement is replaced by methaqualone.

I claim:

1. A method for immobilizing an oily or non-polar substance in a concrete matrix comprising the following steps:
   (a) combining said oily or non-polar substance with sufficient metakaolin to absorb said oily or non-polar substance, said metakaolin being capable of undergoing a pozzolonic reaction with calcium hydroxide and having a particle size of 0.1 to 50 $\mu$m;
   (b) forming a hardenable concrete mix comprising:
      (i) from 5 to 30% by weight, based on the weight of the solids in said mix, of the combined metakaolin and absorbed oily or non-polar substance formed in step (a);
      (ii) from 20 to 95% by weight, based on the weight of the solids in the mix, of a cement;
      (iii) from 0 to 80% by weight, based on the weight of the solids in said mix, of a fine aggregate comprising particles having a size of from 0.15 to 5 mm; and
      (iv) sufficient water to form the hardenable concrete mix; and
   (c) permitting the resultant concrete mix to harden to form a substantially impervious concrete matrix in which said oily or non-polar substance is permanently fixed, the calcium hydroxide formed during hydration of the cement reacting during the hardening process in a pozzolonic reaction with said metakaolin to provide cementitious phases which are incorporated in the bulk structure of the concrete and substantially fill the pores which normally make concrete permeable.

2. A method according to claim 1, wherein the amount of metakaolin employed is at least sufficient to absorb the oily or non-polar substance.

3. A method according to claim 1, wherein at least 0.5 kilogram of metakaolin is employed per kilogram of oily or non-polar substance.

4. A method according to claim 1, wherein the amount of metakaolin employed does not exceed 5.0 kilograms per kilogram of oily or non-polar substance.

5. A method according to claim 1, wherein the amount of the metakaolin used is from 1.0 to 2.0 kg. per kilogram of oily or non-polar substance.

6. A method according to claim 1, wherein the metakaolin is formed by calcining a kaolinitic clay mineral at about 750° C. for about 4 hours.

7. A method according to claim 1, wherein the oily or non-polar substance is a toxic liquid component of a waste material.

8. A hardenable concrete mix incorporating a metakaolin onto which is absorbed an oily or non-polar substance, said metakaolin being formed by heating a calcined kandite clay mineral to a temperature in the range from 450° C. to 950° C. for a time such that the loss on ignition for two hours at 1000° C. of a sample of the calcined mineral is less than 1% by weight.

9. A substantially liquid impervious concrete matrix having an oily or non-polar substance substantially permanently isolated within pores in the matrix, said pores being sealed off from each other by the mineral which crystallizes in situ in the pozzolonic reaction between a metakaolin and calcium hydroxide formed during hydration of the cement in the concrete matrix, said metakaolin being formed by heating a calcined kandite clay mineral to a temperature in the range from 450° C. to 950° C. for a time such that the loss on ignition for two hours at 1000° C. of a sample of the calcined mineral is less than 1% by weight.

10. A hardened concrete matrix containing an oily or non-polar substance isolated in the concrete matrix prepared by a method comprising the following steps:
   (a) absorbing said oily or non-polar substance into a metakaolin, said metakaolin being formed by heating a calcined kandite clay mineral to a temperature in the range from 450° C. to 950° C. for a time such that the loss on ignition for two hours at 1000° C. of a sample of the calcined mineral is less than 1% by weight;
   (b) incorporating the metakaolin and absorbed oily or non-polar substance formed in step (a) in a hardenable concrete mix; and
   (c) permitting the resultant concrete mix to harden.

* * * * *